United States Patent [19]
Marlor et al.

[11] Patent Number: 5,557,171
[45] Date of Patent: Sep. 17, 1996

[54] HIGH INTENSITY DISCHARGE LAMP WITH ULTRA VIOLET ABSORBING ENVELOPE

[75] Inventors: Richard C. Marlor, Beverly, Mass.; R. Bruce Biddulph, Exeter, N.H.

[73] Assignee: Osram Sylvania Inc., Danvers, Mass.

[21] Appl. No.: 490,877

[22] Filed: Jun. 15, 1995

[51] Int. Cl.$^6$ .............................. H01J 17/16; H01J 61/30
[52] U.S. Cl. .................. 313/636; 313/112; 501/66; 501/70; 501/905; 428/34.4
[58] Field of Search ..................................... 313/636, 493, 313/112; 501/66, 70, 153, 154, 905; 428/34.4

[56] References Cited

U.S. PATENT DOCUMENTS

| | | | |
|---|---|---|---|
| 4,310,773 | 1/1982 | Zukowski et al. | 313/636 |
| 4,684,847 | 8/1987 | Spierings et al. | 313/493 |
| 5,350,972 | 9/1994 | Bucher et al. | 313/636 |
| 5,391,523 | 2/1995 | Marlor | 313/636 |
| 5,412,280 | 5/1995 | Scott et al. | 313/493 |

*Primary Examiner*—Sandra L. O'Shea
*Assistant Examiner*—Matthew J. Esserman
*Attorney, Agent, or Firm*—William H. McNeill

[57] ABSTRACT

An electric arc discharge lamp has an arc discharge light source which emits both visible light radiation and UV radiation enclosed within a borosilicate, outer glass envelope. The envelope has a transmission of greater than 90% at a wavelength of 425 nm and a transmission of not more than 40% of UV radiation at 320 nm; 8% of UV radiation at 300 nm; and 0.5% of UV radiation at 290 nm. The borosilicate glass comprises, in weight percent: from about 3.89% $Na_2O$; about 1.5% $K_2O$; from 0.0% to about 0.15% $Li_2O$; about 17% $B_2O_3$; about 1.4% $Al_2O_3$; about 0.6% CaO; about 0.35% MgO; about 0.13% $Fe_2O_3$; and the balance $SiO_2$.

2 Claims, 3 Drawing Sheets

HIGH INTENSITY DISCHARGE LAMP WITH ULTRA VIOLET ABSORBING ENVELOPE

TECHNICAL FIELD

This invention relates to high intensity discharge lamps having outer envelopes which absorb ultraviolet (UV) radiation. More particularly, it relates to such an envelope formed of a borosilicate glass which is anti-solarizing and which does not contain lead or arsenic and which is sealable to tungsten.

BACKGROUND ART

The use of iron oxide in soda-lime glass systems for improved UV absorption is known. In such systems the iron oxide content has been up to 0.12 weight %. In these systems, however, this dopant level is known to reduce visible transmission of the glass, particularly in the 650–750 nm range, by 1–2% with glass thickness of 1 mm, an objectionable feature.

UV absorbing borosilicate glass compositions for electric lamps such as high intensity discharge lamps, typically contain either lead and arsenic oxides or lead and cerium oxides. Both lead and arsenic are toxic materials and it would be very advantageous to be able to manufacture acceptable glasses without using these materials. Arsenic oxide is generally employed in glass compositions as a fining agent for glasses which are difficult to fine (i.e., removal of bubbles). Ceria has been used as an acceptable substitute for arsenic oxide for fining glasses. However, in order to use ceria-containing borosilicate glass compositions in the manufacture of outer jackets for high intensity discharge lamps, it has been found necessary to include lead oxide to prevent solarization of the ceria. Absent the lead, it has been found that ceria will produce light absorbing color centers upon UV irradiation. These light absorbing centers darken the outer jacket and seriously reduce the light output. Elimination of the lead and arsenic oxides has produced workable glasses with adequate sealing capabilities to tungsten; however, such glasses (for example, Schott 8487, which is used in Europe for lamp stems and tubulations) do not absorb sufficiently in the UV region to be used as outer envelopes, thus necessitating two types of glass, one for the stem and tubulation and one for the outer jacket. As an illustration, the Schott glass enumerated above has a transmittance of 23% @300 nm, whereas open fixtured lamps employed in the United States must meet the requirements of UL1572 Specification which requires a transmittance of no more than 8% @300 nm. Additionally, to be an acceptable glass for use as the outer jacket of high intensity discharge lamps, any absorption at wavelengths approaching the visible, say, above about 375 nm, must be minimized.

DISCLOSURE OF THE INVENTION

It is, therefore, an object of the invention to obviate the disadvantages of the prior art.

It is another object of the invention to enhance UV absorbing glasses.

Yet another object of the invention is the provision of an UV absorbing glass which does not use lead or arsenic.

These objects are accomplished, in one aspect of the invention, by the provision of a glass suitable for use as the outer envelope of electric discharge lamps which emit both visible and UV radiation and wherein the envelope has a transmission of greater than 90% at a wavelength of 425 nm; a transmission of not more than 40% of UV radiation at a wavelength of 320 nm; 8% of UV radiation at 300 nm; and 0.5% of UV radiation at 290 nm. The glass comprises, in weight percent: from about 3.89% $Na_2O$; about 1.5% $K_2O$; from 0.0% to about 0.15% $Li_2O$; about 17% $B_2O_3$; about 1.4% $Al_2O_3$; about 0.6% CaO; about 0.35% MgO; about 0.13% $Fe_2O_3$; and the balance $SiO_2$.

Glasses made with the above formulation have transmissions of 2% at 300 nm and 92.2% at 600 nm and are suitable for use as the outer jackets of highly loaded high intensity discharge (HID) lamps.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Table 1 lists the composition of the glass of the invention compared with a glass of the prior art.

TABLE 1

| Oxides | Schott 8487 (wgt. %) | AS-16 (wgt %) |
|---|---|---|
| $SiO_2$ | 75.8 | 75.0 |
| $Na_2O$ | 3.8 | 3.89 |
| $K_2O$ | 1.5 | 1.5 |
| $Li_2O$ | 0 | 0.15 |
| $B_2O_3$ | 16.9 | 17.0 |
| $Al_2O_3$ | 1.4 | 1.4 |
| CaO | 0.1 | 0.6 |
| MgO | 0.4 | 0.35 |
| $Fe_2O_3$ | 0.03 | 0.13 |

From Table 1 it will be seen that the primary difference between the prior art glass (Schott 8487) and the glass of this invention, is the inclusion of some 333 percent more iron oxide.

Table 2 illustrates the composition of yet another prior art glass (Schott 8655 which can be used for the outer envelopes of high intensity discharge lamps) having approximately 3 times more iron oxide than the Schott 8487 glass. As will be apparent, the glass designated herein as AS-16 contains 31% more iron oxide than the Schott 8655 glass.

TABLE 2

| OXIDE | Schott 8655 [Wt %] |
|---|---|
| $SiO_2$ | 73.7 |
| $B_2O_3$ | 10.9 |
| $Na_2O$ | 2.2 |
| $K_2O$ | 3.6 |
| CaO | 2.6 |
| MgO | — |
| BaO | — |

TABLE 2-continued

| OXIDE | Schott 8655 [Wt %] |
|---|---|
| $Al_2O_3$ | 3.1 |
| $ZrO_2$ | 2.1 |
| ZnO | 1.6 |
| $Fe_2O_3$ | 0.099 |

Table 3 illustrates the transmission of these two glasses. From these data it can be seen that the UV absorbtion at 300 nm is increased by 35% with the glass of the invention over the prior art glass.

TABLE 3

| Wavelength nm | Schott 8655 % Transmission | AS-16 % Transmission |
|---|---|---|
| 600 | 92.0 | 92.2 |
| 550 | 92.5 | 92.2 |
| 500 | 92.0 | 92.0 |
| 450 | 92.0 | 91.6 |
| 400 | 90.0 | 91.1 |
| 350 | 77.0 | 80.9 |
| 300 | 4.0 | 2.6 |

Figure 1:
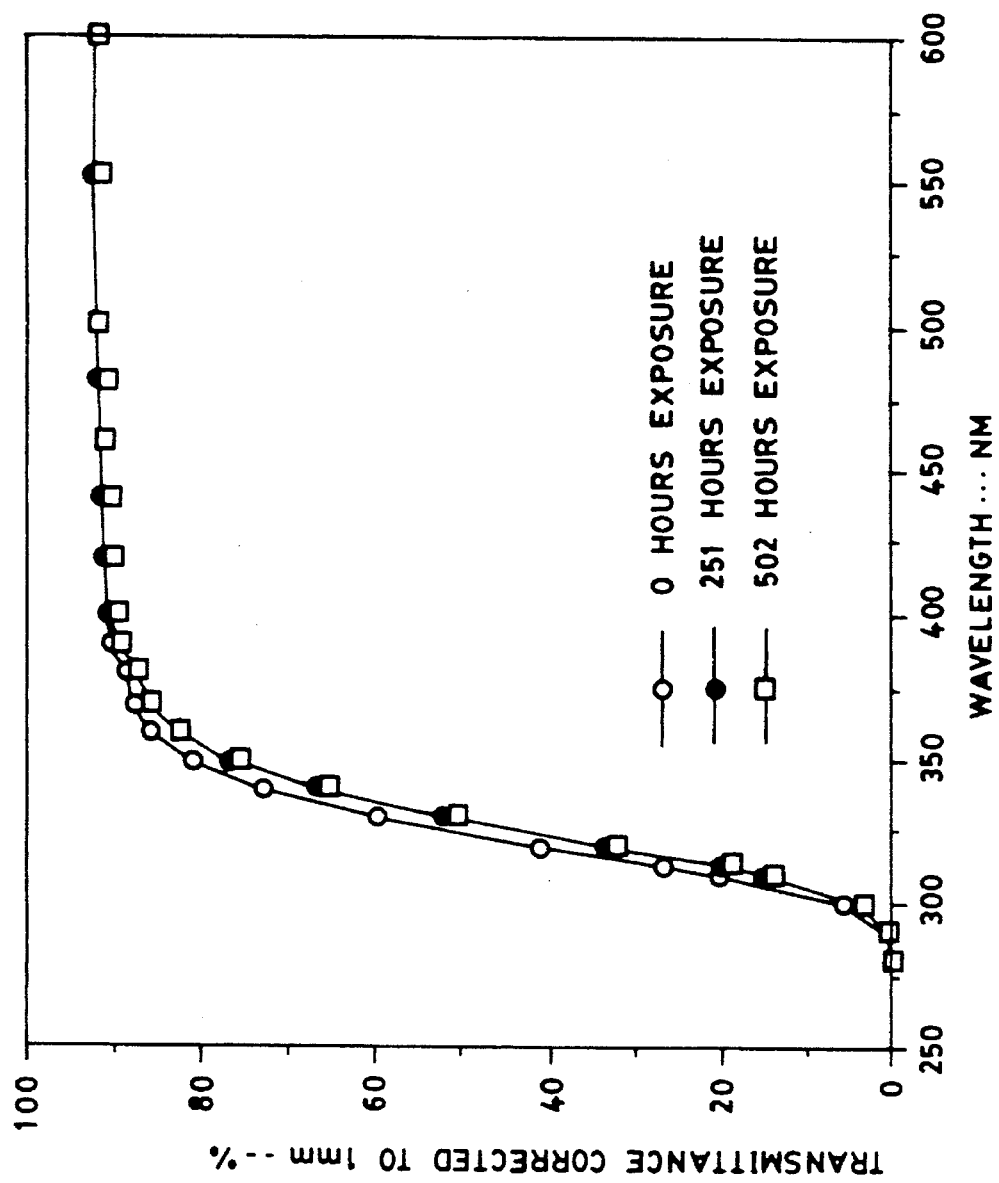
FIG. 1 is a graph illustrating the transmission curve of a prior art glass.
Figure 2:
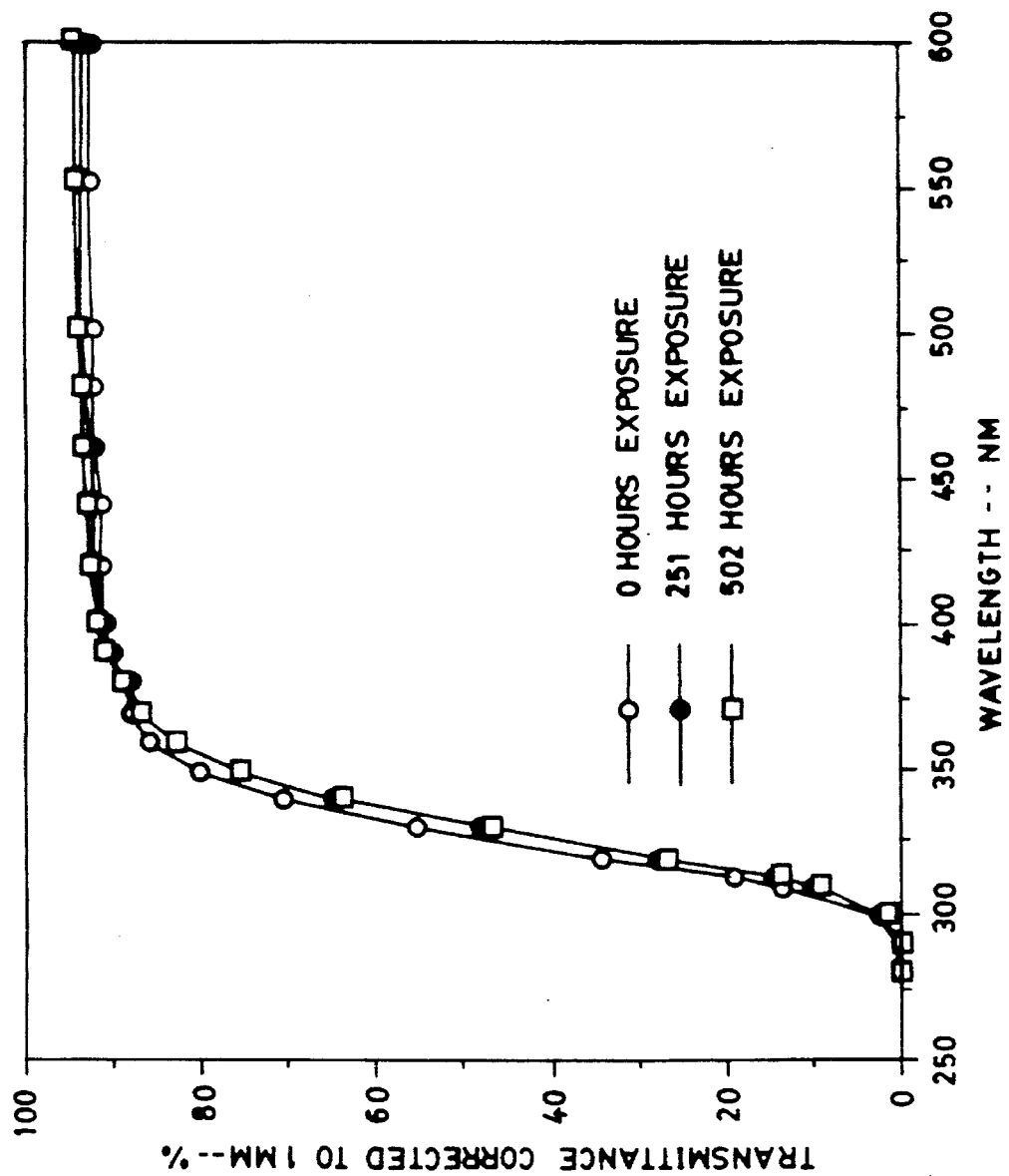
FIG. 2 is a similar graph illustrating the glass of the invention.

These transmission data are graphically presented in FIGS. 1 and 2, with FIG. 1 illustrating the Schott 8655 glass and FIG. 2 the AS-16 glass of the the invention.

Figure 3:
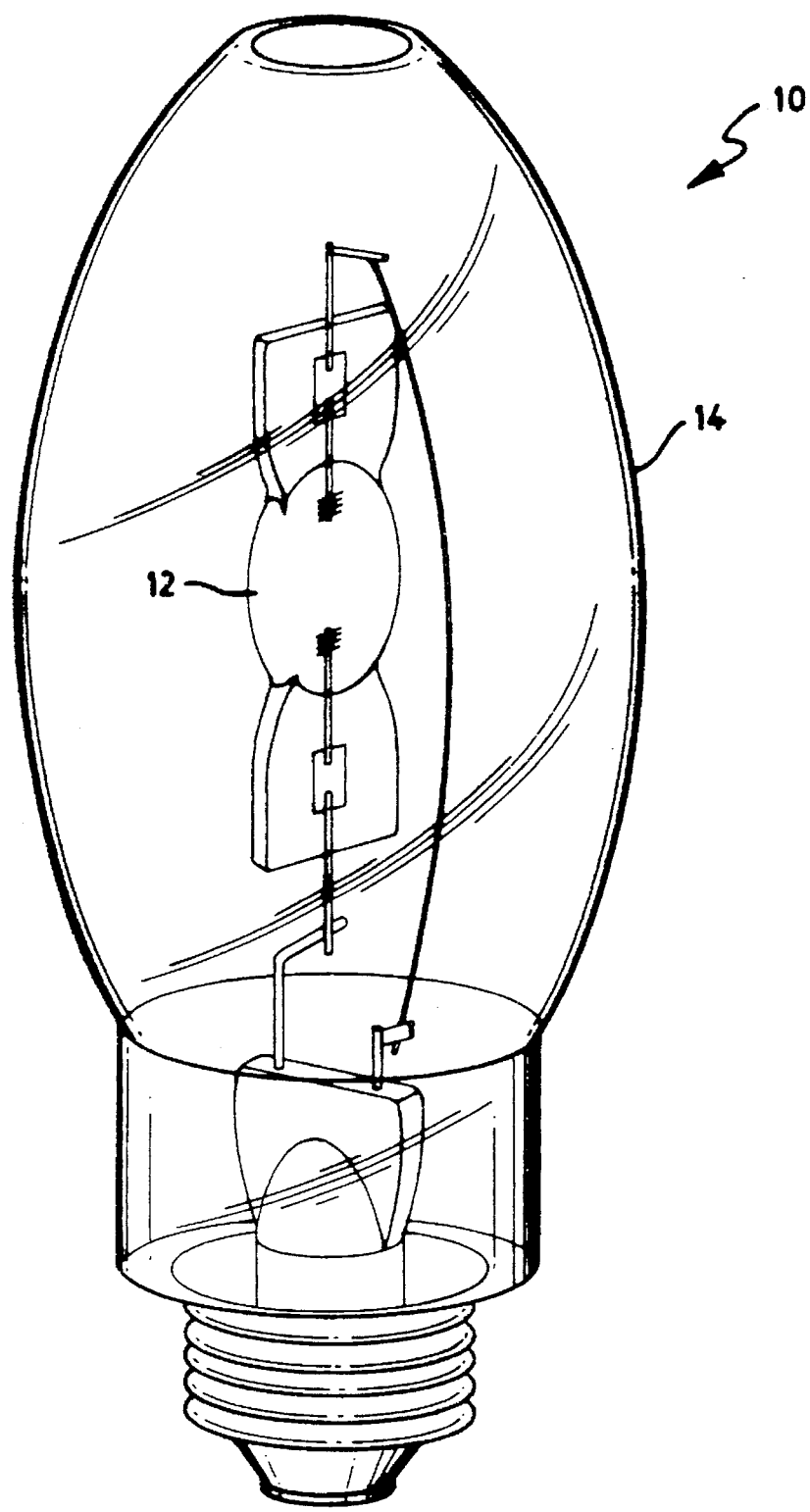
FIG. 3 is a diagrammatic, perspective view of a high intensity discharge lamp.

FIG. 3 illustrates an embodiment of the invention wherein an electric discharge lamp 10 has an arc tube 12 enclosed within a borosilicate glass envelope 14. The arc tube 12, when operating, emits both visible and ultraviolet radiation.

Accordingly, it will be seen that by increasing the iron oxide percentage far beyond the ranges previously believed acceptable, an UV absorbing glass that is solarization resistant and has excellent transmission in the visible range, is provided, without employing any of the oxides of lead, arsenic or cerium.

While there have been shown and described what are at present considered the preferred embodiments of the invention, it will be apparent to those skilled in the art that various changes and modifications can be made herein without departing from the scope of the invention as defined by the appended claims.

What is claimed is;

1. An electric arc discharge lamp having an arc discharge light source which emits both visible light radiation and UV radiation enclosed within a borosilicate glass envelope having a transmission of greater than 90% at a wavelength of 425 nm and a transmission of not more than 40% of said UV radiation at 320 nm; 8% of said UV radiation at 300 nm; and 0.5% of said UV radiation at 290 nm; said borosilicate glass envelope comprising, in weight percent: from about 3.89% $Na_2O$; about 1.5% $K_2O$; from 0.0% to about 0.15% $Li_2O$; about 17% $B_2O_3$; about 1.4% $Al_2O_3$; about 0.6% CaO; about 0.35% MgO; about 0.13% $Fe_2O_3$; and the balance $SiO_2$.

2. The lamp of claim 1 wherein said glass envelope includes 0.15% $Li_2O$.

* * * * *